United States Patent [19]

Okumura et al.

[11] Patent Number: 4,674,071
[45] Date of Patent: Jun. 16, 1987

[54] DATA RECORDING AREA SIGNAL GENERATING METHOD AND APPARATUS

[75] Inventors: Masuo Okumura; Ken Ohshima, both of Tokyo, Japan

[73] Assignee: Olympus Optical Company Limited, Tokyo, Japan

[21] Appl. No.: 652,446

[22] Filed: Sep. 19, 1984

[30] Foreign Application Priority Data

Sep. 19, 1983 [JP] Japan .............................. 58-172634

[51] Int. Cl.⁴ ......................... G11B 5/09; G11B 20/12
[52] U.S. Cl. ........................................ 369/48; 360/48
[58] Field of Search ..................... 369/47, 48, 59, 53; 360/49, 48, 51, 75, 60

[56] References Cited

U.S. PATENT DOCUMENTS

| 4,259,698 | 3/1981 | Takada ................................. 360/75 |
| 4,313,134 | 1/1982 | Rustman et al. ...................... 369/59 |
| 4,345,280 | 8/1982 | Blagaila et al. ...................... 360/49 |

*Primary Examiner*—Vincent P. Canney
*Attorney, Agent, or Firm*—Robert E. Burns; Emmanuel J. Lobato; Bruce L. Adams

[57] ABSTRACT

The invention relates to a method and an apparatus for generating a data recording area signal in order to define an appointed data recording area on a data storing medium which has a multitude of sectors with high information density recorded by means of beam irradiation. The index signal derived from the detected index pattern in a sector is used together with a clock signal supplied.

6 Claims, 4 Drawing Figures

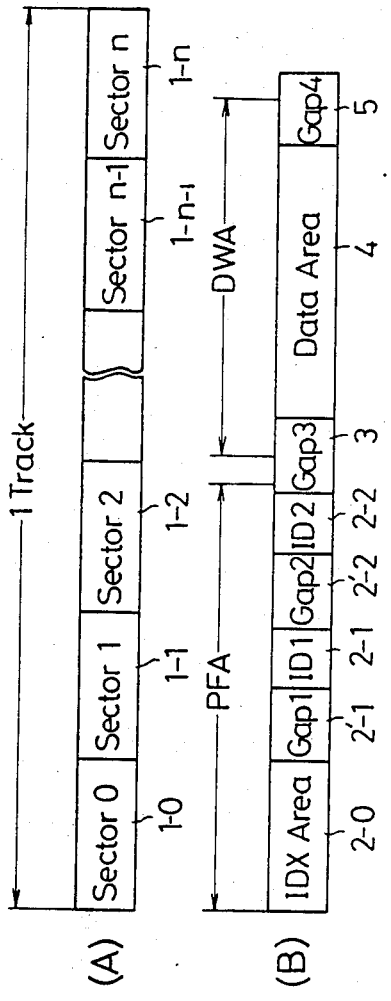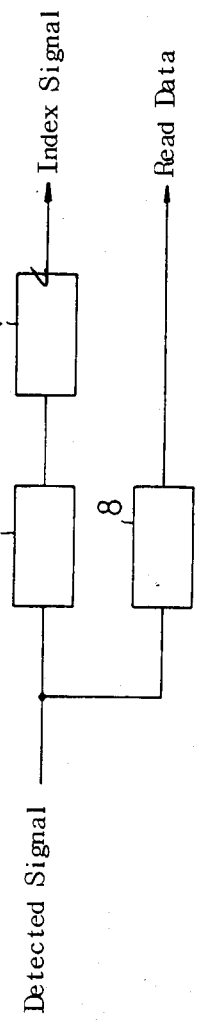

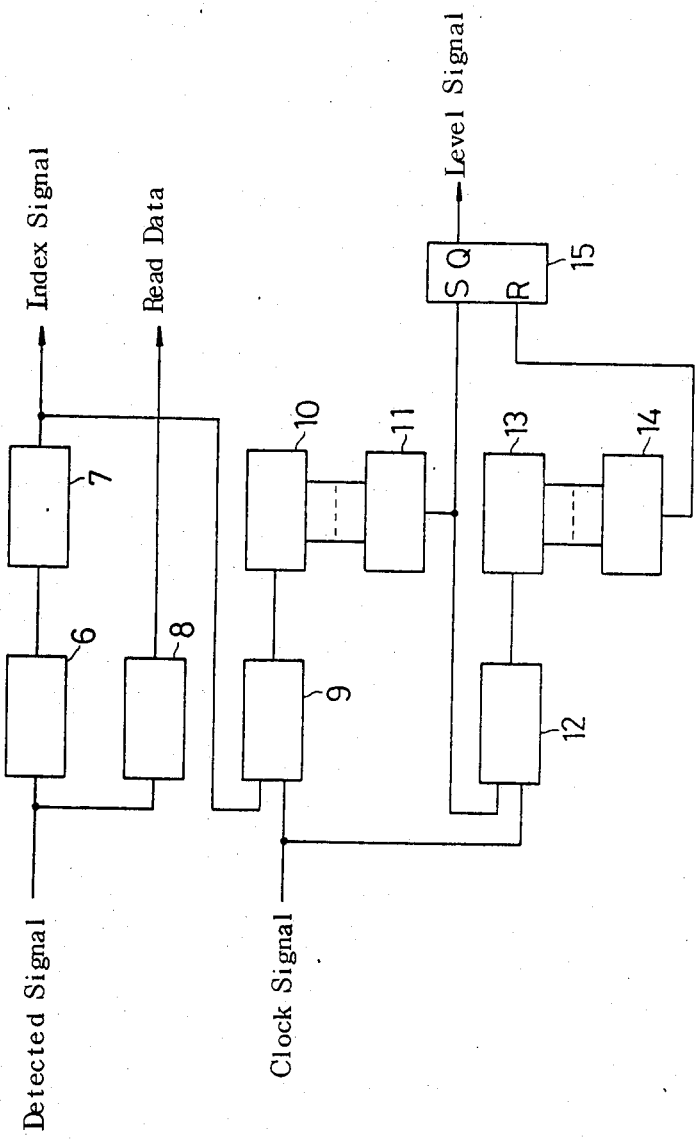

DATA RECORDING AREA SIGNAL GENERATING METHOD AND APPARATUS

BACKGROUND OF THE INVENTION

1. Field of the Invention

The present invention relates generally to a data recording and/or retrieving memory system together with a method and apparatus for generating a data recording area defining signal. More specifically, the present invention relates to a method and apparatus which generates a sector control signal in order to define an appointed data recording area or sector on a data storing medium whereby information is recorded by means of beam irradiation.

2. Description of the Prior Art

A data recording and/or retrieving memory system with high bit packing density data storing or storage medium is known as, for example, a magnetic disc, a magnetooptical memory or a laser disc system. On this data storing medium the information to be stored is recorded in the defined area in a sector, i.e., the multitude division of a track on the data storing medium. A pre-formatted (previously formatted) area (PFA) in a sector contains an index area and the indexes of the address for an adjacent information area, i.e., a data-write-area (DWA) in which data is to be recorded. In order to record the data in the suitable information area, the index signal and the address information are derived from the index pattern in the index area and the following indexes on the said pre-formatted area (PFA).

Thus, in prior art, the information is recorded on the said address in the said data-write-area (DWA) by using the address information derived from the the pre-formatted area (PFA). This prior art is obviously in a less than satisfactory situation when recording high density information and has serious drawbacks of recording on the wrong area or destroying the information stored in the adjacent sector when there is a defect on the data storing medium especially on the pre-formatted area.

SUMMARY OF THE INVENTION

It is an object of the invention to provide a data recording area defining signal generating method and an apparatus which make it possible to overcome the above drawbacks set forth above.

For this purpose a method according to the invention is characterized in that an area signal which is derived from an index signal of an index pattern detected from the index area in the pre-formatted area is used to generate a signal as the data recording area defining signal, whereby the data is properly recorded in the suited location in the said data-write area of the sector on the disc.

A presently preferred embodiment of a data recording area defining signal generating method in accordance with the invention is further characterized in that a clock signal is used to generate this signal. A clock signal is applied to a counter circuit on command of the index signal and the data recording area-defining signal is derived from the area signal by means of a pulse circuit which will be set out hereinafter in conjunction with the detailed description of the preferred embodiments.

An apparatus for generating the data recording area defining signal in accordance with the invention comprises an optical system, detecting means for one or more pre-formatted index patterns located in the sector on the data storing medium, means for deriving of an index signal from the detected index pattern, and generating means for the data recording area-identification signal by making use of an area signal which is derived from the index signal. The apparatus further is equipped with a clock signal generator for deriving the area signal.

As previously described, the invention is based on the recognition that in the case of data recording it is possible to derive the data recording area-defining signal from the index signal by means of the pulse shaping through, for example, counting, delaying or comparing and also this area-defining signal can be used as an inhibiting signal for avoiding unsuitable recording in wrong area or any destroying any of the information recorded in the adjacent sector.

BRIEF DESCRIPTION OF THE DRAWINGS

The invention will be described in more detail with reference to the accompanying drawings, in which:

FIGS. 1(a) and 1(b) are illustrations showing embodiments of an information track on a data storing or storage medium, for example, a disc, to which the invention may be applied; FIG. 1(a) illustrates diagrammatically a configuration of an information track arranged in a train of sectors; and FIG. 1(b) illustrates diagrammatically a configuration of a sector on an enlarged scale;

FIG. 2 is a block diagram showing a configuration of an apparatus for a data recording control section in the prior art;

FIG. 3 is a block diagram illustrating a principle of an apparatus for generating a signal as a data recording area defining signal in accordance with the invention.

DESCRIPTION OF THE PREFERRED EMBODIMENTS

Figure 4:
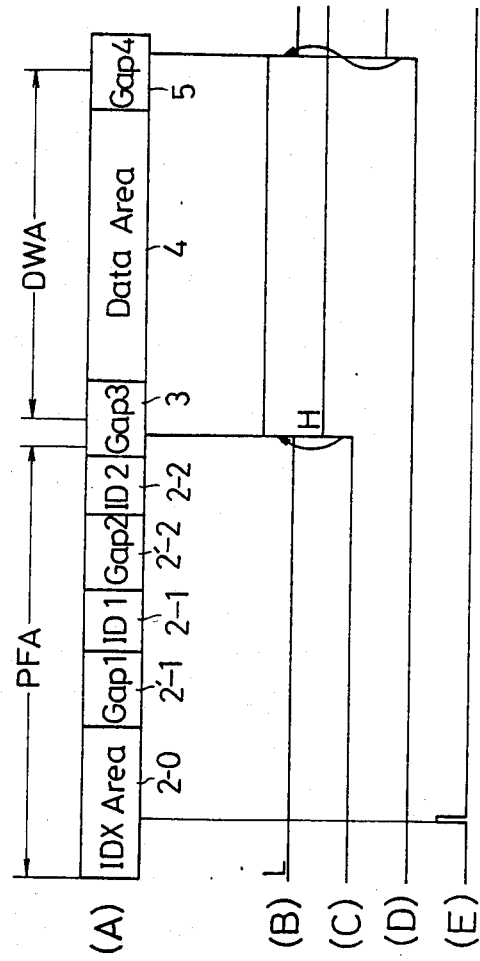
FIG. 4 consisting of (A)–(E), is a diagrammatic representation of a method for generating a signal as a data recording area defining signal in accordance with the invention.

In the embodiment shown in FIG. 1(a) an information track is provided in a rectilinear shape. This track is divided into a multiplicity of sectors (1-0)–(1-n). Each sector forms a data block as shown in FIG. 1(b) comprising a pre-formatted area (PFA) and a data storing area (DSA). A pre-formatted area (PFA) comprises an index area (2-0), gap 1 (2'-1), index 1 (2-1), gap 2 (2'-2), index 2 (2-2) and a part of gap 3 (3), and a data storing area (DSA) comprises a part of gap 3 (3), data area (4) and a part of gap 4 (5). Each elemental block is composed of an appointed number of bytes, for example, 128 bytes for the index area. Self-evidently, the shape of the track is in no way limitative; a spiral track or a set of concentric circular track could be substituted.

For recording the information data, a beam of radiation is produced and directed onto the track in order to detect an index pattern on the top of the sector of a record or storage medium. One or more index patterns located on the index area (2-0) in the pre-formatted area (PFA) is detected and a detection signal is produced by means of an optical pickup not shown. The detected signal is applied to the write/read apparatus for generating an index signal.

FIG. 2 represents an apparatus of data recording control section in the prior art for generating an index signal as a data recording signal generator and the apparatus comprises a pre-pit signal discrimination circuit (6) and a decoder circuit (7) for an index signal and a wave form shaping circuit (8) for a read data. The index signal as the completion signal of detecting the index pattern is derived from the output of the decoder circuit (7) via frequency discrimination by means of the pre-pit signal discrimination circuit (6).

FIG. 3 shows a presently most preferred apparatus for generating a signal as a data recording area defining signal. The detected pattern signal is applied to the pre-pit discrimination circuit (6) and the wave form shaping circuit (8). The frequency discriminated output signal of the pre-pit discrimination circuit (6) produces the index signal by means of decoder circuit (7) as in the prior art shown in FIG. 2. The index signal and a clock signal are applied to a 1st gate circuit (9) and produce a start area signal via a 1st counter (10) and a 1st comparator (11). The start area signal and a clock signal are applied to a 2nd gate circuit (12) and produce an end area signal via a 2nd counter (13) and a 2nd comparator (14). Both the start area signal and the end area signal are supplied to the set S and an reset R terminals of the R-S flip-flop circuit (15) respectively and produce a signal output.

In order to illustrate how the apparatus in accordance with FIG. 3 can be operated, FIG. 4 shows a diagrammatic representation of a method for generating the output signal. The detected signal from the index area (2-0) in FIG. 4A is supplied to the data recording control section and produces the index signal shown in FIG. 4B. The index signal supplied to the 1st gate opens the gate in order to supply the clock signal to the 1st counter circuit (10) (in FIG. 3) and the output signal from the 1st counter circuit is compared with a set count value corresponding to the start point of the data recording area by means of the 1st comparator (11) in FIG. 3. The start area signal shown in FIG. 4C is obtained as the output of the 1st comparator. In other words, the appointed position in the gap 3 (3) where data recording is permitted is accurately defined by the said start area signal. The start area signal is applied to both the set terminal of the R-S flip-flop (15) and the 2nd gate circuit (12) in FIG. 3. The start area signal opens the gate in order to supply the clock signal to the 2nd counter circuit (13) (in FIG. 3) and the output signal from the 2nd counter circuit is compared with a set count value corresponding to the end point of the data storing or recording area by means of the 2nd comparator (14) in FIG. 3. The end area signal shown in FIG. 4D is obtained as the output signal of the 2nd comparator. In other words, the appointed position in the gap 4 (5) from where the data storing is prohibited is accurately defined by the end area signal. The end area signal is applied to the reset terminal of the flip-flop (15). The signal as the data recording area defining signal by which the data recording is properly permitted or inhibited is derived from the output of the said R-S flip-flop depending on the start area signal and on the end area signal.

The invention is not limited to the embodiments shown, which relates to a data recording area signal generating method and an apparatus by means of the above mentioned circuit configurations. The invention may also be used in recording other signals of coded audio, video or other information on the data storing medium.

Furthermore, the invention is not limited to the disc shaped data storing medium but a tape shaped or card shaped data storing medium may also be employed.

What is claimed is:

1. A method for recording on a record medium on an accurately defined recording area comprising, developing a detected signal representative of a format for recording on a record medium, developing from the detected signal an index signal representative of a data recording control signal; applying the index signal to a data recording control section of recording circuitry having a first gate and opening the first gate to apply a clock signal to a first counter for developing an output signal therefrom, comparing the first counter output signal with a set value in a first comparator and representative of a start point of a recording area, developing a start-area signal as an output of the first comparator, applying the start-area signal to both a set terminal of an R-S flip-flop having a control signal input and applying the start area signal to a second gate to open the second gate to supply the clock signal to a second counter, the second counter having an output, comparing the second counter output in a second comparator with a value corresponding to the end point of the data storing area and developing an end-area signal as an output of the second comparator, applying the end area signal to a reset terminal of flip-flop thereby to define the point at which recording is controlled by the recording area signal or is inhibited, whereby the record area on a record medium is accurately defined.

2. A method for accurately defining a recording area on a record medium on which recording is to be effected, comprising receiving a detected signal representative of an index of format instructions for recording on the record medium, developing from the detected signal an index signal corresponding to a data recording control signal, initiating under control of the index signal a first count of clock pulses, comparing the first count with a preset count value to initiate a start-area recording signal when the first count and preset count value correspond for controlling the start of recording on the recording area on the record medium, initiating under control of said index signal a second count of the clock pulses, comparing the second count with a second preset count value to develop an end-area signal when the second count corresponds with the second preset count to control termination of the recording on said recording area, and developing under control of the start-area signal and under control of the end-area signal a data recording area-defining signal, and controlling the application of said area-defining signal for accurately defining the area on the record medium on which recording is to be effected.

3. Apparatus for controlling accurately a recording area on a record medium on which recording is effected by developing of a record area signal comprising means for receiving a signal representative of an index pattern of an indexed area of a record medium, means for developing an index signal representative of a data recording control signal, a first gate to which the index signal is applied for opening the gate to a clock signal, a first counter receptive of the clock signal when the first gate is open for developing an output signal, a first comparator for comparing the output of the first counter with a set value representative of a start point of a recording area on the record medium on which recording is to be effected and developing a start-area signal as an output of the first comparator, an R-S flip-flop means for applying the start-area signal to a set terminal of the R-S flip-flop, a second gate opened by the start-area signal, means for applying a clock signal to the first gate and the second gate, a second counter receiving the clock signal when the second gate is open and developing an output, a second comparator for comparing the output of the second counter with a second set value representative of an end point of said recording area and developing an end-area signal as the output thereof, means for applying the end-area signal to a reset terminal of the R-S flip-flop thereby to accurately define the point at which recording on said record is inhibited, whereby a record area signal output of the R-S flip-flop accurately determines said recording area on which recording is effected on the record medium.

4. Apparatus for controlling accurately a recording area on a record medium on which recording is effected by developing of a record area signal according to claim 3, in which the means for developing the index signal develops the index signal each time under control of detected signals representative of said index pattern on the record medium and corresponding to the first-mentioned signal.

5. Apparatus for accurately controlling recording on different areas as a record medium on which recording is effected by developing a recording area control signal comprising means for developing a detected signal representative of a format for recording on a record medium, means receptive of the detected signals for developing an index signal for controlling accurately recording on areas sequentially recorded on in recording on the record medium, means responsive to the index signal for initiating a start-area signal as a function of a first reference value effective to start the recording to define the start point of a recording area on the record medium, means for providing the first reference value, means responsive to the start-area signal for developing an end-area control signal as a function of a second reference signal value effective to inhibit recording on the record medium, defining an end point on said area on which recording is effected, and means for providing the second reference value.

6. Apparatus for accurately controlling recording on a record medium on which recording is effected comprising, means for receiving detected signals representative of individual index patterns of different recording areas of a record medium on which recording is to be effected, means receptive of the detected signals for developing an index signal for controlling accurately each individual recording area on which recording is effected, means responsive to the index signal including first counting means for counting clock pulses to a first count, means for developing a start-area signal for effecting control of recording and initiating recording at a start-area point of recording on a recording area when the first count corresponds with a first preset count, means responsive to the start-area signal including second counting means for counting clock pulses to a second count and means for developing an end-area control signal, and means responsive to said end-area control signal for inhibiting recording on said area for accurately defining an end-area point for termination of recording on the record medium when the second count corresponds with a second preset count.

* * * * *